Nov. 4, 1958
K. R. MILLER
2,859,316
POTENTIOMETER, MULTIPLE TURN WITH SCREW FED SLIDER
Filed March 1, 1956
2 Sheets-Sheet 1
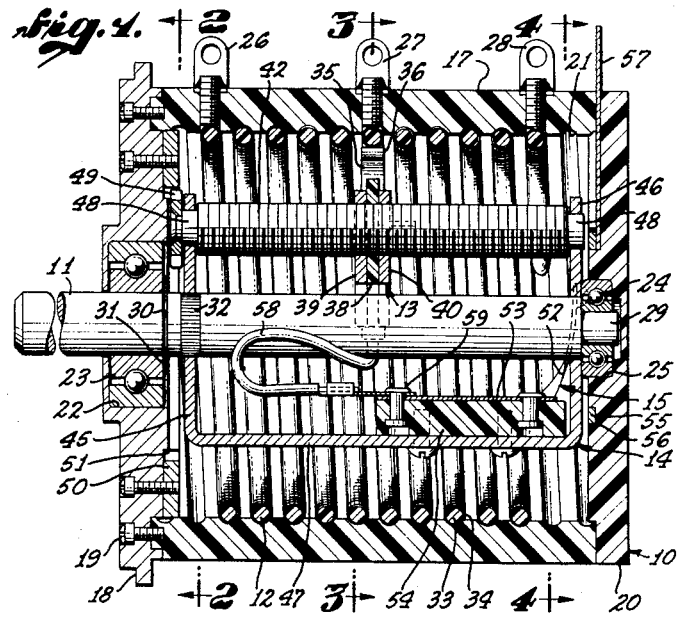
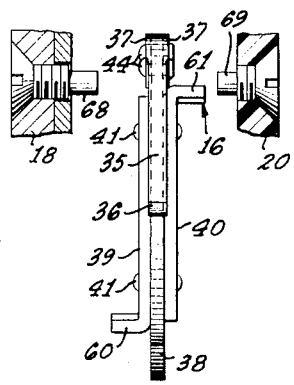
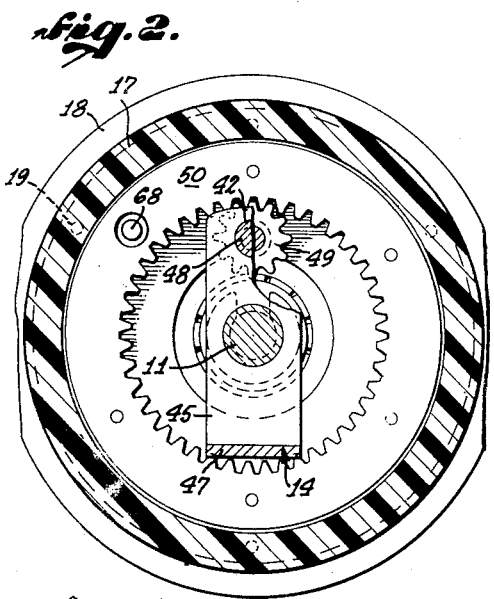
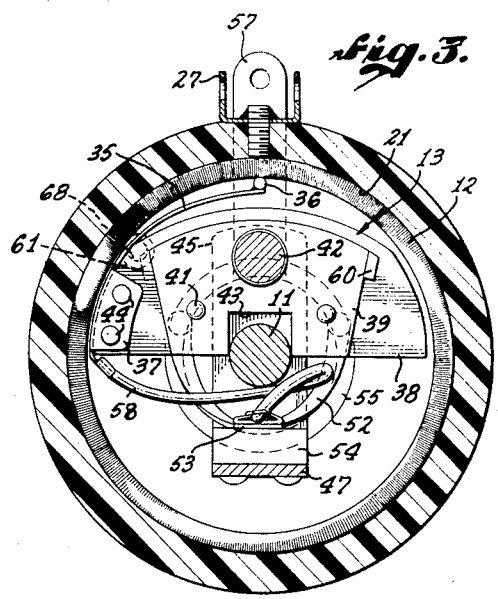
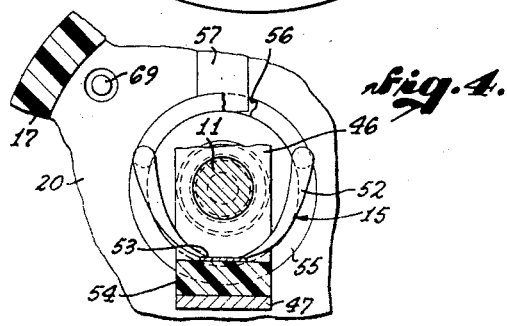
KENNETH R. MILLER,
INVENTOR.
BY *Lynn H Latta*
ATTORNEY.

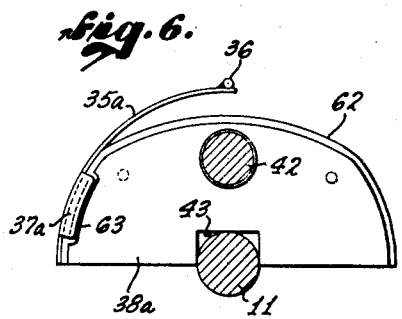
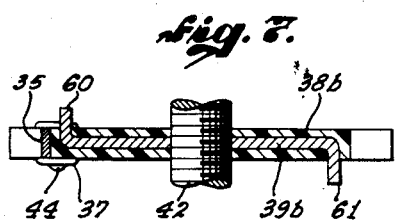
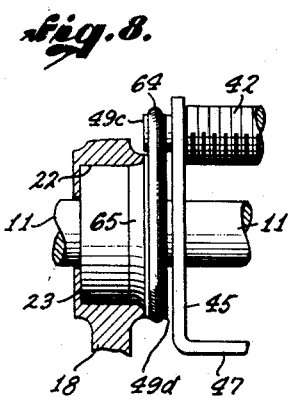
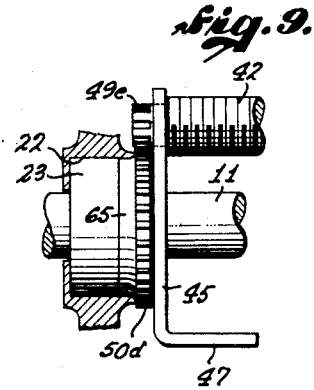
KENNETH R. MILLER,
INVENTOR.

United States Patent Office 2,859,316
Patented Nov. 4, 1958

2,859,316

POTENTIOMETER, MULTIPLE TURN WITH SCREW FED SLIDER

Kenneth R. Miller, Redondo Beach, Calif., assignor to Topp Industries, Inc., Los Angeles, Calif., a corporation of California Application March 1, 1956, Serial No. 568,852

5 Claims. (Cl. 201—56)

This invention relates to potentiometers of the type utilizing a multiple turn helical resistant element with a slider moving helically to follow the turns thereof. More specifically, the invention relates to that type of multiple turn helical coil potentiometer wherein a lead screw is utilized for advancing the slider axially as it rotates about the axis of the coil.

Such potentiometers, utilizing a lead screw having an axis coincident with the common axis of the driving shaft and helical resistance elements, have heretofore been designed but are fairly bulky and not very acceptable. Potentiometers with helical resistance elements, avoiding the use of a lead screw and utilizing guide means on the slider, straddling the resistance element, have proven somewhat more successful but are subject to a number of objections, including excessive back lash, high wear on the guide tabs of insulating material (the helical coil acts as a rasp, cutting into the guidetabs); the working of foreign matter (e. g. powdered material cut away from the guide tabs) between the turns of fine wire in the coiled resistance element; and relatively high friction between the slider assembly and the coiled resistance elements. A somewhat similar arrangement, wherein a single guide tab locates in a groove between adjacent coils of the resistance element, has similar objections.

The present invention has as its general object to provide an improved potentiometer of the multiple turn resistance element type, embodying an improved lead screw mechanism for guiding the slider in a path following the helical turns of the resistance element.

A specific object is to eliminate abrasive action between the slider assembly and the helical resistance element. Another object is to minimize the settling of particles of dust and other foreign material between the fine turns of the resistance wire.

A further object is to provide such a potentiometer having minimal back-lash and minimal resistance loading of the actuator shaft.

A further object is to provide a rugged positive stop mechanism for determining the respective limits of potentiometer adjustment, completely relieving the slider from any loading at the limit positions, and thereby providing high accuracy in the limit positions of contact of the slider against the resistance element.

A further object is to provide such a potentiometer having an improved collector brush and slip ring connection for carrying current between the slider and an external terminal on the potentiometer case.

In general, the invention contemplates a potentiometer wherein a lead screw, disposed eccentrically with reference to the major axis of the potentiometer, is rotated by a positive drive connection between such screw and the case, such rotation being of a planetary type and derived from the actuator shaft of the potentiometer, driving the lead screw gear in an orbital path. In this arrangement, a particular object of the invention is to arrange the parts so that the torque load transmitted from the actuator shaft to the slider assembly, bypasses said positive drive connection so that the latter is not subjected to the load, and will therefore operate more freely and more accurately than would otherwise be possible.

Other objects will become apparent in the ensuing specifications and appended drawing in which:

Fig. 1 is an axial sectional view, on an enlarged scale, of a potentiometer embodying the invention;

Fig. 2 is a cross-sectional view thereof taken on the line 2—2 of Fig. 1;

Fig. 3 is a cross-sectional view of the same taken on the line 3—3 of Fig. 1;

Fig. 4 is a detail fragmentary sectional view taken on the line 4—4 of Fig. 1;

Fig. 5 is a fragmentary sectional view of the potentiometer, illustrating particularly the slider assembly and limit stop mechanism;

Fig. 6 is a cross-sectional view illustrating a modified form of the slider mount;

Fig. 7 is a sectional view of another modified form of the slider mount;

Fig. 8 is a fragmentary side elevation of a modified form of the lead screw gearing; and Fig. 9 is a fragmentary side view of another modified form of the lead screw gearing.

*The preferred form of the invention Figs. 1–5*

Referring now to Figs. 1 to 5 in detail, I have shown therein a preferred form of my invention embodying generally a case 10 of insulating material; an actuator shaft 11 at the major axis of the potentiometer; a helical resistance coil 12 fixedly mounted within the case, coaxial with said major axis; a slider assembly 13 for following the coil 12 in establishing electrical contact therewith; a lead screw and transmission assembly 14 for simultaneously rotating the slider assembly along the turns of the resistance element 12 and feeding the slider assembly in an axial direction so as to develop a component of helical movement matching the helical configuration of the resistance element; a brush and slip ring assembly 15 for establishing an electrical connection between the slider 13 and the exterior of the case; and limiting stop mechanism 16 (Fig. 5) for establishing the limits of slider movement.

*Casing parts.*—In detail, casing 10 includes a cylindrical barrel 17, a front cap 18 attached to the forward end of barrel 17 by cap screws 19, and a rear cap 20 secured to the rear end of barrel 17 by cap screws (not shown).

Barrel 17 has in its inner wall a helical groove 21 in which resistance elements 12 is mounted. Front cap 18 has a counterbore 22 in which is mounted the outer race of a ball bearing 23, the inner race thereof receiving and mounting the forward end of actuator shaft 11. A smaller bearing 24, supporting the rear end of actuator shaft 11, is mounted in a counterbore 25 in rear cap 20.

Binding post terminals 26, 27, and 28 are mounted in barrel 17, and may be in the form of screws threaded into bores in the barrel as indicated.

*Actuator shaft.*—Actuator shaft 11 has at its rear end a reduced stem 29 mounted in the inner race of bearing 24, and an adjacent shoulder which has end bearing engagement against said inner race. Near its forward end, shaft 11 has an annular rectangular groove 30 in which is mounted a snap ring 31 having end bearing engagement against the inner race of bearing 23. Just inwardly of groove 30, shaft 11 has a section 32 for driving engagement with the transmission assembly 14.

*Resistance element.*—Resistance element 12 includes a solid core 33 of insulating material (e. g. hard plastic or nylon) or an insulated metallic material in the form of a helical coil; and a covering of fine resistance wire 34 wound about core 33 and secured thereto as by cementing. Resistance wire 34 is helical both as to its individual turns around core 33 and as to its general overall configuration as determined by the helical form of core 33. Terminals 26—28 are electrically connected to either end resistance element 12 by pressure contact, or by welding. Terminals 26 and 28 being end terminals and terminal 27 being an intermediate tap. Additional terminals are provided for taps as required.

Slider 13 consists generally in a spring contact arm 35 having at its center a contact 36 and having at one end a slightly curved sliding free end and at its other end a pair of ears 37 integrally formed on respective side margins thereof and embracing one end portion of a carriage which is of sandwich form, including a central yoke 38 (a flat slab of insulating material) and respective face plates 39, 40, of metal, secured to yoke 38 by rivets 41. In this sandwich carriage structure, all three parts (or the two face plates 39, 40) have registering threaded apertures, receiving a lead screw 42, and have registering rectangular notches 43, the parallel sides of which bear against respective sides of shaft 11 at diametrically opposite points thereon, with minimum clearance consistent with free sliding movement. This combination of engagement with the lead screw and with the shaft 11 accurately positions the carriage 38—40 in symmetrical relation to the axis of shaft 11, and preventing any tilting movement with respect to either the shaft or the lead screw. The end portions of yoke 38 are elongated beyond the respective ends of plates 39, 40 and have end margins that are preferably arcuate, concentric with and evenly spaced from resistance element 12, the contact arm 35 being mounted against one of these arcuate end margins, extending circumferentially, and secured to the projecting end portion of yoke 38 by rivets 44 extending through the ears 37 which embrace said projecting end portion. The insulation yoke 38 insulates the slider arm 35 from the face plates 39, 40. Arm 35, when unstressed, is of arcuate curvature concentric with the resistance coil 12. It is flexed inwardly slightly by the engagement of contact 36 against coil 12, thus maintaining a very light yielding engagement thereagainst.

The three parts 38, 39 and 40 of the carriage conjointly function as a follower nut, travelling axially in response to rotation of the lead screw 42.

*Transmission assembly.*—Transmission assembly 14 provides a mounting for lead screw 42 and a means for rotating the same about its own axis as well as swinging it in a planetating path around the major axis of the potentiometer. It comprises a bracket of rectangular yoke form having respective arms 45 and 46 joined by a web 47, arms 45 and 46 having aligned apertures snugly receiving shaft 11. The knurling 32 of shaft 11 is press-fitted into the aperture of arm 45 to provide a driving connection between shaft 11 and the bracket. Near their free ends, arms 45, 46 are provided with bearing apertures in which are journalled trunnions 48 on the respective ends of lead screw 42. To the trunnion 48 adjacent arm 45 is secured a spur pinion 49. A ring gear 50 is secured as shown, to the inner face of front cap 18 of the case, and is piloted in concentric relation to the major axis by the engagement of the tips of the ring gear teeth against a shallow annular shoulder 51 on cap 18. Gearing 49, 50 provides a positive drive connection between the lead screw and the case, such as to translate planetary movement of lead screw 42 into rotation thereof in bracket 45—47.

The ratio between the pitch of thread 42 and the pitch of resistance element 12 is so related to the gear ratio of drive connection 49, 50 that the rotation of lead screw 42 will advance the slider carriage 38—40 at the proper rate to maintain contact 36 constantly in register with the turns of resistance element 12. In the arrangement shown, the gear ratio between pinion 49 and ring gear 50 is intended to be 4:1 (i. e. the pinion will rotate four revolutions for each complete planetating swing around the ring gear) and in this case the relationship between the pitch of the lead screw thread and the pitch of resistance element 12 will be 1:4 so that it will take four revolutions of the lead screw to advance the follower carriage the pitch distance between adjacent turns of resistance element 12.

*Collector brush assembly.*—The collector brush assembly 15 comprises a brush 52 of fork shape on one end of a shank 53 which is mounted to bracket web 47 through the medium of an insulator block 54. Fork 52 has tips bearing against a collector ring 55 which is mounted in a shallow flat annular face groove 56 in the inner face of rear cap 20. A bus-bar 57, soldered at its inner end to collector ring 55, projects outwardly between rear cap 20 and the adjacent end of barrel 17 as shown in Fig. 1, and provides a terminal connection for the collector assembly. The connection between shank 53 and contact bar 35 is provided by a short link of flexible conductor cable 58. The connection to shank 53 may utilize one of a pair of rivets 59 by means of which shank 53 is secured to insulator block 54. Electrical connection between terminal 57 and wiper contact 36 is established by this mechanism.

*Limiting stop mechanism.*—The stop mechanism 16 comprises a pair of stop pins 68, 69 mounted in respective end caps 18, 20 of the case, together with fingers 60, 61 integrally formed at opposite corners of respective carriage face plates 39, 40 and projecting in opposite directions away from yoke 38, the fingers 60, 61 and pins 68, 69 being located at approximately equal radial distances from the major axis of the potentiometer so that a finger 60 or 61, after clearing the end of a pin 68 or 69, in a turn preceding the final swing of the slider carriage around the major axis, will be shifted by the screw fed travel of the carriage, into a position where on the next turn it will contact the respective stop pin 68 or 69. Since the fingers 60, 61 are integral with the rather heavy face plates 39, 40 which in turn are securely braced by their threaded engagement with feed screw 42 and the embracing engagement of shaft 11, the limiting action will be positive and rugged so that no strain can be imposed upon the delicate parts of the mechanism by the impact of the limiting fingers 60, 61 against stop pins 68, 69.

Modified form of slider carriage

Fig. 6 illustrates how the slider carriage may be modified to utilize a single metal yoke 38a having substantially the same peripheral contour as yoke 38 and having a rim of insulator tape 62 (which may be of fairly rigid solid plastic material) securely bonded to its periphery. Slider arm 35a is mounted by means of a clasp 37a formed integrally therewith and folded tightly around a stretch of strip 62 bridging over a recess 63 in the periphery of yoke 38a.

Fig. 7 shows a further modification of the slider carriage, wherein yoke 38b, of the same peripheral contour as yoke 38, is formed as a solid body of molded plastic and wherein a single metal plate 39b is molded into yoke 38b and has opposite end portions bent laterally and projecting through the opposite faces of yoke 38b to provide the respective stop fingers 60, 61. Slider arm 35 in this case may be the same as in Fig. 3 and secured in the same manner to one end of yoke 38b.

Modified form of transmission assembly

Fig. 8 disclosed how, instead of the planetary gear arrangement of Fig. 1 for driving the lead screw 42, there may be utilized a belt 64 of spring coil material trained around small pulley 49c on the end of lead screw 42 and a large pulley 49d which may be secured to the case, as by being means of a hub 65 press-fitted into bore 22. Pulleys 49c and 49d may be provided with serrated or toothed grooves to mate with the coils of belt 64 for positive drive transmission.

Fig. 9 illustrates a further modification wherein a spur pinion 49e on the end of lead screw 42 meshes with a spur gear 50d secured to the case.

The desired gear ratio may be attained, using either of the constructions of Fig. 8 and Fig. 9, by suitable proportioning of the diameters of the drive elements 49c, 50c, 49d, 50d respectively.

I claim:

1. In a potentiometer, a case including a cylindrical barrel of insulating material and respective end caps; a hollow multiple turn complex helical resistance coil mounted to the inner wall of said barrel and defining peripherally a cylindrical open space within said case; a slider unit including a carriage, a contact, and a spring arm mounting said contact on said carriage for light yielding engagement of said contact against said resistance coil; an actuator shaft at the axis of said coil journalled in the respective end caps and projecting through and externally of one of them; a slip ring mounted in one of said end caps; a transmission bracket of rectangular yoke form, including parallel side arms mounted on said shaft at right angles thereto and adjacent to the respective end caps, and a web integral with and joining said side arms and extending parallel to said shaft on one side thereof; a mounting block of insulating material mounted on the inner side of said web; a contact brush mounted on said block and electrically connected to said slider spring arm, said brush being of bifurcated form including spring arms straddling the adjacent side arm of said bracket and both engaging said slip ring resiliently and yieldingly; a lead screw journalled on said side arms, eccentric and parallel to said shaft on the opposite side thereof from said web, said shaft benig secured to said bracket for transmitting rotation thereto, whereby to swing said lead screw in an orbital path around said coil axis; positive drive means operating between said case and lead screw to effect rotation of said lead screw in said bracket as the result of said orbital movement; said carriage embodying follower nut means meshing with said lead screw to effect axial travel of said carriage; the ratio of lead screw pitch to coil pitch being related to the gear ratio of said drive means so as to translate the combination of orbital movement and axial travel of said carriage into movement of said contact in a helical path following the turns of said resistance coil.

2. In a potentiometer, a case including a cylindrical barrel of insulating material and respective end caps; a hollow multiple complex helical resistance coil mounted to the inner wall of said barrel and defining peripherally a cylindrical open space within said case; a slider unit including a carriage, a contact, and a spring arm mounting said contact on said carriage for light yielding engagement of said contact against said resistance coil; an actuator shaft at the axis of said coil, journalled in the respective end caps and projecting through and externally of one of them; a transmission bracket of rectangular yoke form, including parallel side arms mounted on said shaft, at right angles thereto and adjacent the respective end caps, and a web integral with and joining said side arms and extending parallel to said shaft on one side thereof; a lead screw journalled on said side arms, eccentric and parallel to said shaft on the opposite side thereof from said web, said shaft being secured to said bracket for transmitting rotation thereto, whereby to swing said lead screw in an orbital path around said coil axis; positive drive means operating between said case and lead screw to effect rotation of said lead screw in said bracket as the result of said orbital movement; said carriage embodying follower nut means meshing with said lead screw to effect axial travel of said carriage; the ratio of lead screw pitch to coil pitch being related to the gear ratio of said drive means so as to translate the combination of orbital movement and axial travel of said carriage into movement of said contact in a helical path following the turns of said resistance coil; a slip ring mounted in one of said end caps; a contact brush mounted on said bracket, electrically connected to said slider arm, and yieldingly engaging said slip ring; and a terminal connected to said slip ring and projecting externally of said case; said carriage being of sandwich structure, including a central plate of insulating material and metal face plates secured to respective faces thereof, said face plates having threads meshing with said lead screw to constitute said follower nut means; an end of said central plate being exposed beyond said face plates to provide an insulator support to which an end of said slider arm is mounted.

3. A potentiometer as defined in claim 2, wherein said face plates have respective integral stop fingers projecting axially therefrom; and further including stops anchored in the respective end caps in positions to be engaged by the respective stop fingers at respective limits of helical travel of said carriage, to positively determine said limits.

4. In a potentiometer, a case including a cylindrical barrel of insulating material and respective end caps; a hollow multiple complex helical resistance coil mounted to the inner wall of said barrel and defining peripherally a cylindrical open space within said case; a slider unit including a carriage, a contact, and a spring arm mounting said contact on said carriage for light yielding engagement of said contact against said resistance coil; an actuator shaft at the axis of said coil, journalled in the respective end caps and projecting through and externally of one of them; a transmission bracket of rectangular yoke form, including parallel side arms mounted on said shaft, at right angles thereto and adjacent the respective end caps, and a web integral with and joining said side arms and extending parallel to said shaft on one side thereof; a lead screw journalled on said side arms, eccentric and parallel to said shaft on the opposite side thereof from said web, said shaft being secured to said bracket for transmitting rotation thereto, whereby to swing said lead screw in an orbital path around said coil axis; positive drive means operating between said case and lead screw to effect rotation of said lead screw in said bracket as the result of said orbital movement; said carriage embodying follower nut means meshing with said lead screw to effect axial travel of said carriage; the ratio of lead screw pitch to coil pitch being related to the gear ratio of said drive means so as to translate the combination of orbital movement and axial travel of said carriage into movement of said contact in a helical path following the turns of said resistance coil; a slip ring mounted in one of said end caps; a contact brush mounted on said bracket, electrically connected to said slider arm, and yieldingly engaging said slip ring; and a terminal connected to said slip ring and projecting externally of said case; said carriage comprising a metal body having a threaded bore through which said lead screw extends with meshing engagement, and a strip of relatively rigid insulating material bonded to the periphery of said metal body, said slider brush being anchored to said strip and insulated from said metal body.

5. In a potentiometer, a case including a cylindrical barrel of insulating material and respective end caps; a hollow multiple complex helical resistance coil mounted to the inner wall of said barrel and defining peripherally a cylindrical open space within said case; a slider unit including a carriage, a contact, and a spring arm mounting said contact on said carriage for light yielding engagement of said contact against said resistance coil; an actuator shaft at the axis of said coil, journalled in the respective end caps and projecting through and externally of one of them; a transmission bracket of rectangular yoke form, including parallel side arms mounted on said shaft, at right angles thereto and adjacent the respective end caps, and a web integral with and joining said side arms and extending parallel to said shaft on one side thereof; a lead screw journalled on said side arms, eccentric and parallel to said shaft on the opposite side thereof from said web, said shaft being secured to said bracket for transmitting rotation thereto, whereby to swing said lead screw in an orbital path around said coil axis; positive drive means operating between said case and lead screw to effect rotation of said lead screw in said bracket as the result of said orbital movement; said carriage embodying follower nut means meshing with said lead screw to effect axial travel of said carriage; the ratio of lead screw pitch to coil pitch being related to the gear ratio of said drive means so as to translate the combination of orbital movement and axial travel of said carriage into movement of said contact in a helical path following the turns of said resistance coil; a slip ring mounted in one of said end caps; a contact brush mounted on said bracket, electrically connected to said slider arm, and yieldingly engaging said slip ring; and a terminal connected to said slip ring and projecting externally of said case; said slider comprising a metal core plate and a body of insulating material molded about said core plate and projecting beyond the ends thereof, said slider being anchored to one of the projecting ends of said body; said core plate having, at respective ends, integral stop fingers projecting axially therefrom toward opposite ends of the case; and said potentiometer further including stops anchored in the respective end caps in positions to be engaged by the respective stop fingers at respective limits of helical travel of said carriage, to positively determine said limits.

References Cited in the file of this patent

UNITED STATES PATENTS

| | | |
|---|---|---|
| 2,452,676 | O'Brien | Nov. 2, 1948 |
| 2,454,986 | Beckman | Nov. 30, 1948 |
| 2,505,980 | Mautner | May 2, 1950 |
| 2,724,034 | Altieri | Nov. 15, 1955 |